(12) United States Patent
Walls et al.

(10) Patent No.: US 8,879,896 B2
(45) Date of Patent: *Nov. 4, 2014

(54) METHOD AND APPARATUS TO FACILITATE THE EFFICIENT IMPLEMENTATION OF TRICK MODES IN A PERSONAL VIDEO RECORDING SYSTEM

(75) Inventors: Frederick George Walls, Tustin, CA (US); David M. Erickson, San Clemente, CA (US); Marcus Kellerman, Aliso Viejo, CA (US); Joshua Stults, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 908 days.

This patent is subject to a terminal disclaimer.

(21) Appl. No.: 12/847,541

(22) Filed: Jul. 30, 2010

(65) Prior Publication Data

US 2010/0290759 A1   Nov. 18, 2010

Related U.S. Application Data

(63) Continuation of application No. 10/215,540, filed on Aug. 9, 2002, now Pat. No. 7,826,718.

(51) Int. Cl.
| | |
|---|---|
| *H04N 5/783* | (2006.01) |
| *G11B 27/00* | (2006.01) |
| *G11B 27/32* | (2006.01) |
| *G11B 27/10* | (2006.01) |
| *G11B 27/034* | (2006.01) |
| *H04N 5/76* | (2006.01) |
| *H04N 9/82* | (2006.01) |
| *H04N 5/781* | (2006.01) |
| *H04N 9/804* | (2006.01) |

(52) U.S. Cl.
CPC ............... *H04N 5/76* (2013.01); *H04N 9/8205* (2013.01); *G11B 2220/20* (2013.01); *G11B 27/005* (2013.01); *H04N 5/781* (2013.01); *H04N 5/783* (2013.01); *G11B 27/329* (2013.01); *G11B 27/105* (2013.01); *G11B 27/034* (2013.01); *H04N 9/8042* (2013.01)

USPC .......................................... 386/343; 386/351

(58) Field of Classification Search
USPC .................................................. 386/343–352
See application file for complete search history.

(56) References Cited

U.S. PATENT DOCUMENTS

| | | |
|---|---|---|
| 5,838,380 A | 11/1998 | Sun et al. |
| 5,959,690 A | 9/1999 | Toebes et al. |

(Continued)

FOREIGN PATENT DOCUMENTS

| | | |
|---|---|---|
| WO | WO-99/62251 | 12/1999 |
| WO | WO-01/15167 | 3/2001 |

(Continued)

OTHER PUBLICATIONS

Electronics Industries Alliance, Transport of Content Advisory Information Using Extended Data Service (XDS), EIA-744-A, Dec. 1998, Revision of EIA-0744.

(Continued)

*Primary Examiner* — Thai Tran
*Assistant Examiner* — Nigar Chowdhury
(74) *Attorney, Agent, or Firm* — Foley & Lardner LLP

(57) ABSTRACT

A method and apparatus are disclosed for facilitating efficient operation of trick modes in a personal video recording (PVR) system. Stream-navigation data from a data stream is captured and pre-processed to generate a frame-correlated NAV table comprising one entry for each frame within the data stream, during recording of the data stream. The stream-navigation data comprises start code data, content rating data, and conditional access data that is embedded in the data stream. During playback of the data stream in a user-selected trick mode, the frame-correlated NAV table is used to generate command packets that are sent to a data decoder along with selected frames of the data stream. The selected frames are decoded based on information in the command packets and certain selected frames may be displayed as part of the trick mode.

20 Claims, 4 Drawing Sheets

(56) References Cited

U.S. PATENT DOCUMENTS

| | | |
|---|---|---|
| 6,480,666 B1 | 11/2002 | Wilson et al. |
| 6,580,870 B1 | 6/2003 | Kanazawa et al. |
| 6,760,915 B2 | 7/2004 | DeCarmo |
| 2001/0026675 A1 | 10/2001 | Schultz et al. |
| 2003/0123849 A1* | 7/2003 | Nallur et al. .................. 386/68 |

FOREIGN PATENT DOCUMENTS

| | | |
|---|---|---|
| WO | WO-01/82607 | 11/2001 |
| WO | WO-02/19690 | 3/2002 |

OTHER PUBLICATIONS

European Search Report for EP Application No. 03018261.2, dated Dec. 11, 2003, 3 pages.

International Organization for Standardization, Information Technology—Generic Coding of Moving Pictures and Associated Audio Information: System, ISO/IEC 13818-1, First Edition, Apr. 15, 1996, ISO/IEC.

International Organization for Standardization, Information Technology—Generic Coding of Moving Pictures and Associated Audio Information: Systems, ISO/IEC 13818-1, First Edition—Amendment 6, Apr. 15, 2000, ISP/IEC.

International Organization for Standardization, Information Technology—Generic Coding of Moving Pictures and Associated Audio Information: Systems, ISO/IEC 13818-1:1996, Technical Corrigendum 1, ISO/IEC 1999.

International Organization for Standardization, Information Technology—Generic Coding of Moving Pictures and Associated Audio Information: Video, ISO/IEC 13818-2, First Edition, May 15, 1996.

* cited by examiner

US 8,879,896 B2

METHOD AND APPARATUS TO FACILITATE THE EFFICIENT IMPLEMENTATION OF TRICK MODES IN A PERSONAL VIDEO RECORDING SYSTEM

CROSS REFERENCE TO RELATED APPLICATIONS

N/A

BACKGROUND OF THE INVENTION

Embodiments of the present invention relate generally to a method and apparatus for performing trick modes in a personal video recording (PVR) system, and more particularly to generating a NAV table of data entries to facilitate the efficient playback of certain MPEG frames of an MPEG transport stream for a user-selected trick mode.

Personal Video Recording (PVR) is becoming an increasingly popular feature in advanced interactive digital set-top boxes for cable and satellite systems. PVR allows users to record programs to a hard disk and play the programs back with advanced features including random access and simultaneous play-and-record. Implementing rewind and fast-forward capabilities with PVR requires "trick modes" which give the user the experience of rapidly moving through the video.

Certain trick modes, such as fast-forwarding through a group-of-pictures (GOP)-based MPEG stream, may be implemented easily. Other trick modes, such as smooth-motion rewind or any trick mode using progressive-refresh MPEG streams, may require special processing by the MPEG decoder. Also, the PVR system is not able to analyze an encrypted MPEG stream upon playback and, therefore, some level of analysis should be performed before playback.

It is desirable for the PVR system to have immediate, frame-accurate access to a wide range of information about the MPEG stream without having to over-burden the central processor of the PVR system during playback. Also, it is desirable for the PVR system to maintain correct content rating and encryption states at all times while skipping variable amounts of MPEG stream data during the trick mode.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide a method and apparatus, in a personal video recording (PVR) system, for facilitating efficient operation of trick modes.

A method of the present invention provides for capturing stream-navigation data from a data transport stream and pre-processing the stream-navigation data to generate a frame-correlated NAV table comprising one entry for each video frame within the data stream, during recording of the data stream. The stream-navigation data comprises start code data, content rating data, and conditional access data that is embedded in the data stream. During playback of the data stream in a user-selected trick mode, the frame-correlated NAV table is used to generate command packets that are used to facilitate decoding of selected frames of the data stream and displaying of certain selected frames as part of the trick mode.

Apparatus of the present invention provides a data transport processor receiving a data stream and capturing stream-navigation data from the data stream during recording of the data stream. A host processor pre-processes the stream-navigation data to generate a frame-correlated NAV table. The host processor also generates command packets based on, at least in part, the frame-correlated NAV table. A data decoder receives the command packets and certain data frames of the data stream from the host processor during playback of the data stream in a user-selected trick mode. The data decoder processes the command packets and the certain data frames to generate certain displayed frames during the trick mode.

Certain embodiments of the present invention afford an approach for generating a frame-correlated NAV table that may be used to facilitate trick modes in a PVR system such that the processing load of a host processor is greatly reduced during playback of the data stream in a user-selected trick mode.

These and other advantages and novel features of the present invention, as well as details of an illustrated embodiment thereof, will be more fully understood from the following description and drawings.

DETAILED DESCRIPTION OF THE INVENTION

While the detailed description that follows is made with specific reference to the MPEG standard, it should be understood that aspects of the present invention may be applied to other streams of data besides MPEG transport. Examples of such other streams include PES, ES, DirecTV transport, etc.

The following MPEG related and content rating related specifications are incorporated herein by reference in their entirety:

ISO/IEC 13818-1:1996, Information Technology-Generic Coding of Moving Pictures and Associated Audio: Systems ISO/IEC 13818-2:1995, Information Technology-Generic Coding of Moving Pictures and Associated Audio: Video EIA-744-A, "Transport of content advisory information using extended data service (XDS)", 1998.

Figure 1:
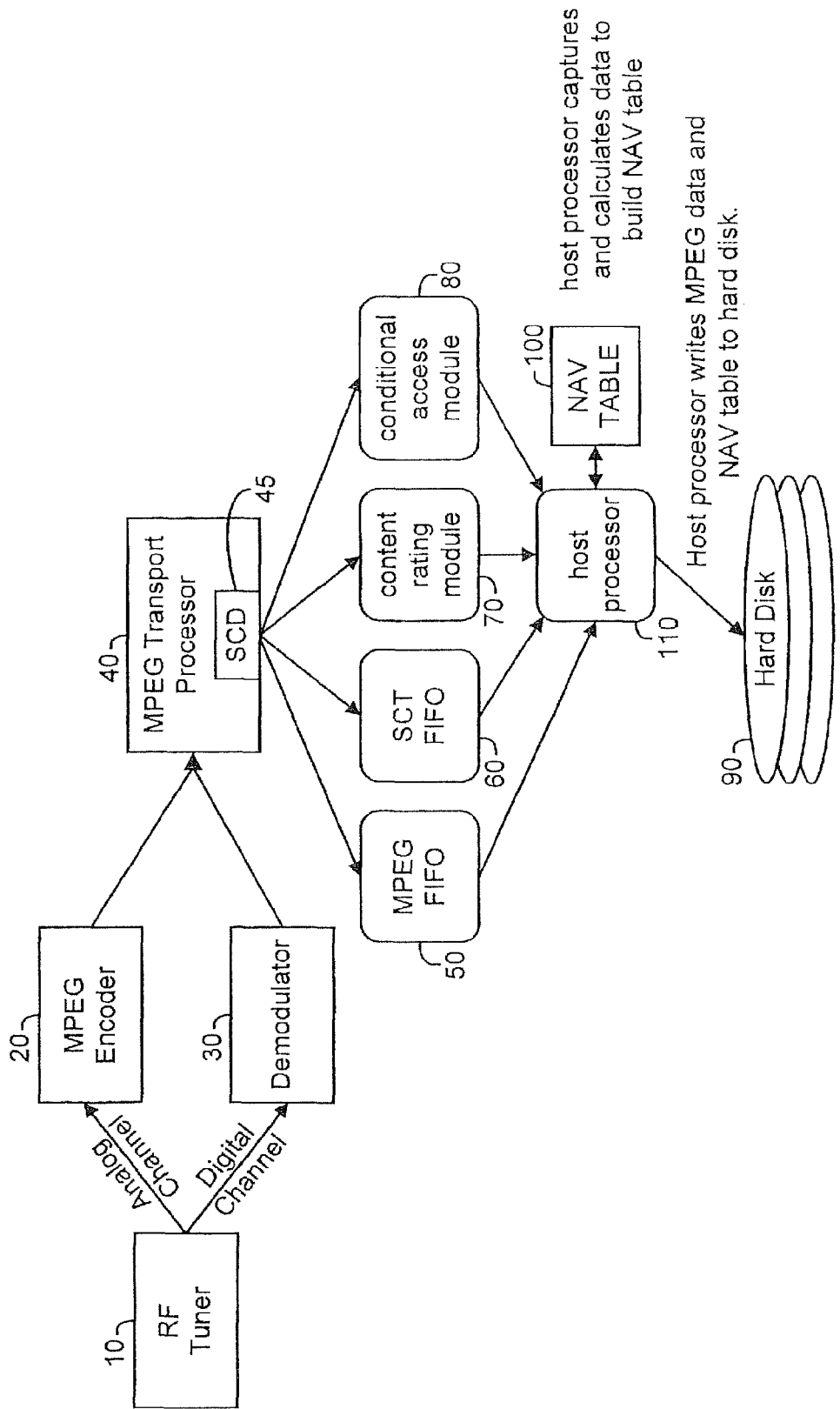
FIG. 1 is a schematic block diagram illustrating various elements in a PVR system for generating a frame-correlated NAV table during recording of a data stream in accordance with an embodiment of the present invention.

FIG. 1 is a schematic block diagram illustrating certain elements in a PVR system for generating a frame-correlated NAV table 100 during recording of an MPEG transport stream in accordance with an embodiment of the present invention. The certain elements include an RF tuner 10, an MPEG encoder 20, a demodulator 30, an MPEG transport processor 40, a host processor 110, and a hard disk 90. Other certain elements include an MPEG FIFO 50, a start code detection (SCD) module 45, a start code table (SCT) FIFO 60, a content rating module 70, and a conditional access module 80 in accordance with an embodiment of the present invention.

In an embodiment of the present invention, the MPEG transport processor 40 receives an MPEG transport stream from either an MPEG encoder 20 (for an analog broadcast) or directly from the demodulated broadcast medium (for a digital broadcast), demodulator 30. The MPEG transport stream is pipelined through MPEG FIFO 50 to hard disk 90, under the control of host processor 110, where the MPEG transport stream is stored.

Figure 2:
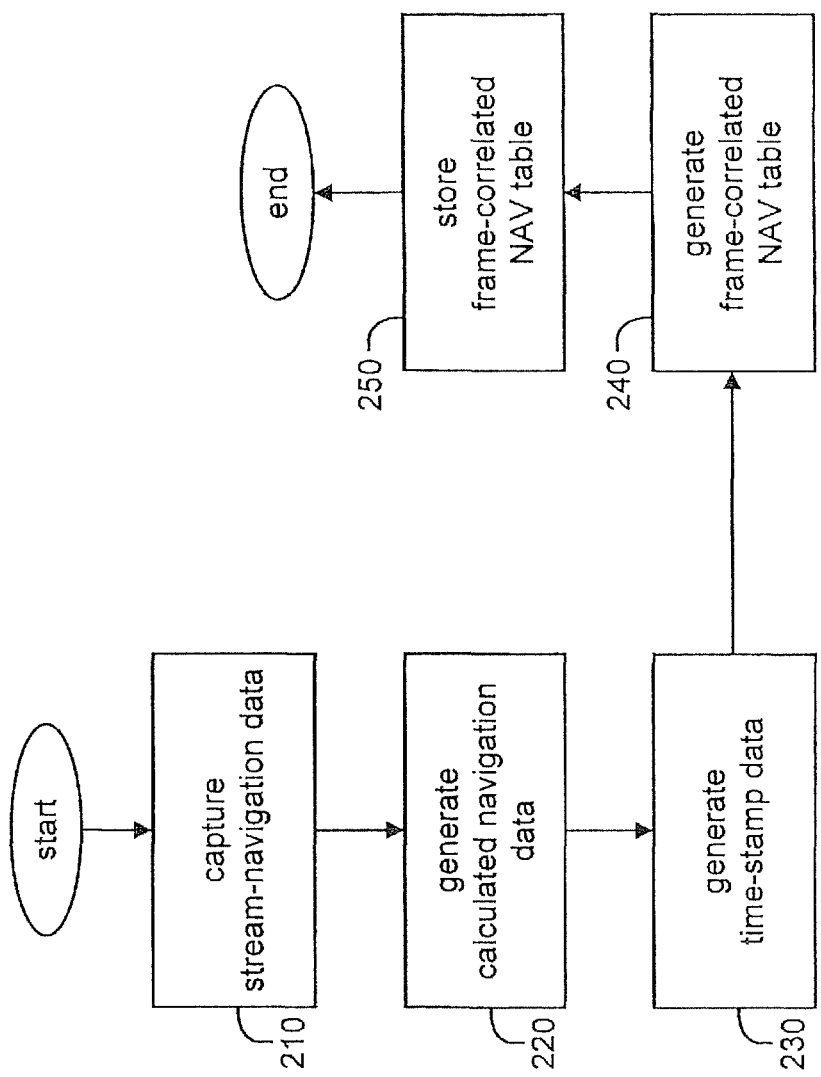
FIG. 2 is a flowchart of a method for generating the frame-correlated NAV table of FIG. 1 to facilitate trick modes in a PVR system in accordance with an embodiment of the present invention.

Referring to method 200 of FIG. 2, the MPEG transport processor 40 captures stream-navigation data from the MPEG transport stream in step 210. The stream-navigation data is already embedded in the MPEG transport stream in accordance with the MPEG standard. The MPEG transport processor 40 includes a start code detection (SCD) module 45 that extracts start code data from the MPEG transport stream. Other stream-navigation data that is captured from the MPEG transport stream in step 210 includes content rating data and conditional access (encryption) data.

In an embodiment of the present invention, the SCD module 45 generates a start code table (SCT) that serves as a simple index into the MPEG transport stream. The index includes an entry for every start code in the MPEG transport stream. Each start code index entry points to either the beginning of a new picture, a sequence header, or a presentation time stamp (PTS) entry. The start code entry data is pipelined through SCT FIFO 60 to host processor 110 during recording of the MPEG transport stream.

In an embodiment of the present invention, each start code index entry comprises four 32-bit words. An exemplary format for each word is given in Table 1.

For PTS entries, an illegal start code value of 0xFE is used as an escape mechanism to indicate an entry for PTS. An exemplary index table entry for PTS entries is given below in Table 2.

TABLE 2

SCT entry for PTS

| Word | Element | Bits | Description |
|---|---|---|---|
| 0 | Start code value | 31:24 | For PTS entries, this field is set to 0xFE. |
| 0 | Reserved | 23:1 | |
| 0 | PTS[32] | 0 | The 33$^{rd}$ bit of this PTS |
| 1 | PTS[31:0] | 31:0 | The lower 32 bits of this PTS |
| 2 | Reserved | 31:0 | |
| 3 | Reserved | 31:0 | |

The content rating module 70 receives the content rating data that was captured from the MPEG transport stream from the MPEG transport processor 40 in step 210 and sends the content rating data to the host processor 110.

The conditional access module 80 receives the conditional access (encryption) data that was captured from the MPEG transport stream from the MPEG transport processor 40 in step 210 and sends the conditional access data to the host processor 110.

In step 220, the host processor 110 generates calculated navigation data from the captured stream-navigation data. In step 240, certain captured and calculated stream-navigation data is written to a frame-correlated NAV table 100, one entry for each frame of the MPEG transport stream. In step 250 the frame-correlated NAV table 100 is saved to hard disk 90.

Also, the host processor 110 generates time stamp data in step 230 that is correlated to the MPEG transport stream and writes the time stamp data to each entry of the frame-corre-

TABLE 1

SCT entry

| Word | Element | Bits | Description |
|---|---|---|---|
| 0 | Start code value | 31:24 | The value of the PES packet stream_id or elementary stream start code for this entry |
| 0 | Contents | 23:8 | The value of the first two bytes after the start code for this entry. For PES stream_id's, this will be the packet length. For ES start codes, these two bytes will be the two bytes following the start code within the elementary stream. |
| 0 | Packet Offset | 7:0 | The offset from the start of the transport packet containing the start code for this entry to the first 00 byte of the start code pattern 00 00 01 XX, where XX is the start code for this entry. An offset of zero indicates the first byte of the transport packet. |
| 1 | Record count | 31:0 | A count in number of bytes from the start of this record session to the start of the transport packet containing the start code for this entry. A count of zero indicates the first byte in this record session |
| 2 | Reserved | 31:0 | |
| 3 | PD_ERR | 31 | Set if packets were dropped for the corresponding record channel |
| 3 | CC_ERR | 30 | Set if a continuity count error was detected for the corresponding record channel |
| 3 | TEI_ERR | 29 | Set if the transport error indicator was set in one of the recorded packets |
| 3 | SC_ERR | 28 | Set if a start code index entry was dropped due to internal buffer overflow |
| 3 | PES_LEN_ERR | 27 | Set if the previous PES packet had an error in its length |
| 3 | Reserved | 26:0 | | lated NAV Table corresponding to each frame of the MPEG transport stream in steps 240 and 250.

Each resultant entry in the frame-correlated NAV table for each frame of the MPEG transport stream comprises an array of fixed sized fields according to an embodiment of the present invention. Table 3 illustrates a set of fields in an exemplary frame-correlated NAV table in accordance with an embodiment of the present invention.

TABLE 3

NAV Table Fields

| Field Index | Name |
|---|---|
| 0 | frameType |
| 1 | seqHdrStartOffset |
| 2 | seqHdrSize |
| 3 | refFrameOffset |
| 4 | frameOffsetHi |
| 5 | frameOffsetLo |
| 6 | framePts |
| 7 | frameSize |
| 8 | timestamp |
| 9 | contentRating |
| 10 | caInfo |
| 11 | errFlags |

A description of each field is given below in accordance with an embodiment of the present invention.

Field 0: frameType

Definition: Indicates whether the frame is an I-frame (for GOP-based streams), P-frame, B-frame or reference P-frame (a P frame in a progressive-refresh stream that contains the first I-slice). An I-frame contains an entire frame that can be decoded by itself. A P-frame depends on the previous I- or P-frame in order to be decoded. A B-frame depends on the previous and next I- or P-frame in order to be decoded.

How captured: Whenever an SCT entry points to a new picture, a new NAV table entry is created and the frame type is copied from the SCT entry to the NAV entry.

How used: Fast rewind and fast forward trick modes provide that certain frames be dropped, and the frame type is used to know which frames may be dropped while still having all the frames used for decoding. Frame type is also used to build non-displayed reference frames used for smooth-rewind and progressive-refresh trick modes.

Field 1: seqHdrStartOffset (sequence header start offset)

Definition: Number of bytes from the frameOffset to the first sequence header that precedes the frame. The sequence header contains information such as quantization settings and frame size that are used to decode the frame.

How captured: Whenever an SCT entry points to a sequence header, the sequence header location is copied to all subsequent NAV entries until a new sequence header is detected.

How used: While skipping frames during a trick mode, sequence headers are not skipped. Therefore, when performing a trick mode, the playback engine keeps track of the last sequence header sent to the decoder. The last sequence header is compared to the sequence header for each frame, and if different, that frame's sequence header is then sent.

Field 2: seqHdrSize (sequence header size)

Definition: Size in bytes of the sequence header pointed to by seqHdrStartOffset.

How captured: The offset of the SCT entry immediately following a sequence header SCT entry is used to calculate the size of the sequence header.

How used: The size is used along with the seqHdrStartOffset to send the correct sequence header to the decoder.

Field 3: refFrameOffset (reference frame offset)

Definition: Number of bytes from the frameOffset to the reference frame for the current frame. In a GOP-based stream, the reference frame would be the previous I-frame. In a progressive-refresh stream, the reference frame would be the previous reference P-frame.

How captured: Whenever an SCT entry points to an I-frame (in a GOP-based stream) or a reference P-frame (in a progressive-refresh stream), that offset is copied to all subsequent NAV entries as the refFrameOffset until a new reference frame is detected.

How used: In order to implement a smooth-rewind trick mode or any trick mode with progressive-refresh streams, the decoder begins with a reference frame against which it may predict subsequent P- or B-frames until the desired frame may be displayed. The field allows the reference frame for any P or B to be accessed immediately.

Field 4: frameOffsetHi

Definition: Upper 32 bits of the 64-bit offset into the MPEG stream for the frame.

How captured: Because the SCT entry may only contain 32 bits of frame offset data, the host processor generates an additional 32 bits of high offset at record time. The high 32 bits are calculated by incrementing a 32-bit field every time the lower 32 bit frame offset wraps.

How used: Used to locate the frame in the MPEG stream in a file larger than 4 GB.

Field 5: frameOffsetLo

Definition: Lower 32 bits of the 64-bit offset into the MPEG stream for the frame.

How captured: When a SCT entry points to a picture frame, the offset of the picture frame is copied to the NAV entry.

How used: Used to locate the frame in the MPEG stream.

Field 6: framePts

Definition: PTS (presentation time stamp) for the frame. The PTS is the time base in the MPEG stream and may not be continuous across commercial and program changes.

How captured: Whenever an SCT entry contains PTS information, that PTS information is copied into every subsequent NAV entry until a new PTS entry is detected.

How used: During a trick mode, the decoder's timebase may be sent the PTS information, which allows applications to use the PTS as a consistent indicator of the current content being displayed.

Field 7: frameSize

Definition: Size in bytes of the frame.

How captured: After detecting a picture SCT entry and creating a new NAV entry, the offset of the next SCT entry which points to either another picture or a sequence header is used to calculate the size of the previous frame.

How used: The frameSize and frameOffset are used to send a single frame to the decoder.

Field 8: timestamp

Definition: Current relative time to the beginning of the stream in milliseconds. Unlike PTS, timestamp is guaranteed to be continuous throughout the entire recorded stream.

How captured: The host processor populates the timestamp field at record time using the system clock. The accuracy of the timestamp only meets the requirements of the application. 1-second accuracy is probably sufficient to implement a 30-second jump.

How used: The field enables random access features like "advance 30 seconds." The host processor scans the index until it finds the timestamp that is approximately 30 seconds from the current location and is guaranteed to work across commercials and program changes.

Field 9: contentRating

Definition: Content rating for the program at the current frame (e.g. TV-G, TV-MA). Allows the parental control system to remain in a correct state while in a trick mode.

How captured: The transport hardware detects content rating changes in the MPEG stream. The host processor reads the information, correlates the stream offset of the content rating change with the SCT index, and copies the information into all subsequent NAV Table entries until another content rating change is detected.

How used: During trick modes, the host processor reads the content rating information and sets the parental control system's state.

Field 10: caInfo (conditional access information)

Definition: Contains specialized information used to decrypt the particular section of the stream. The format of the field depends on the encryption scheme used. Allows the decoder to continue decrypting a stream while in a trick mode.

How captured: The transport hardware detects encryption changes in the MPEG stream at record time. The host processor reads the information, correlates the stream offset of the encryption change with the SCT index, and copies the information into all subsequent NAV entries until another encryption change is detected.

How used: During trick modes, the host processor reads the encryption information and sets the decoder's state.

Field 11: errFlags (error flags)

Definition: Indicate if there were errors reported by the MPEG transport processor within the frame.

How captured: If any error flags are set in an SCT entry, the error bits are copied to the corresponding NAV Table entry.

How used: The host processor may choose to skip certain frames that are known to contain errors.

Once the frame-correlated NAV table 100 is generated and stored to hard disk 90 during recording of a corresponding MPEG transport stream, the MPEG transport stream may be played back. During playback, trick modes may be selected by the user and executed by the PVR system.

Figure 3:
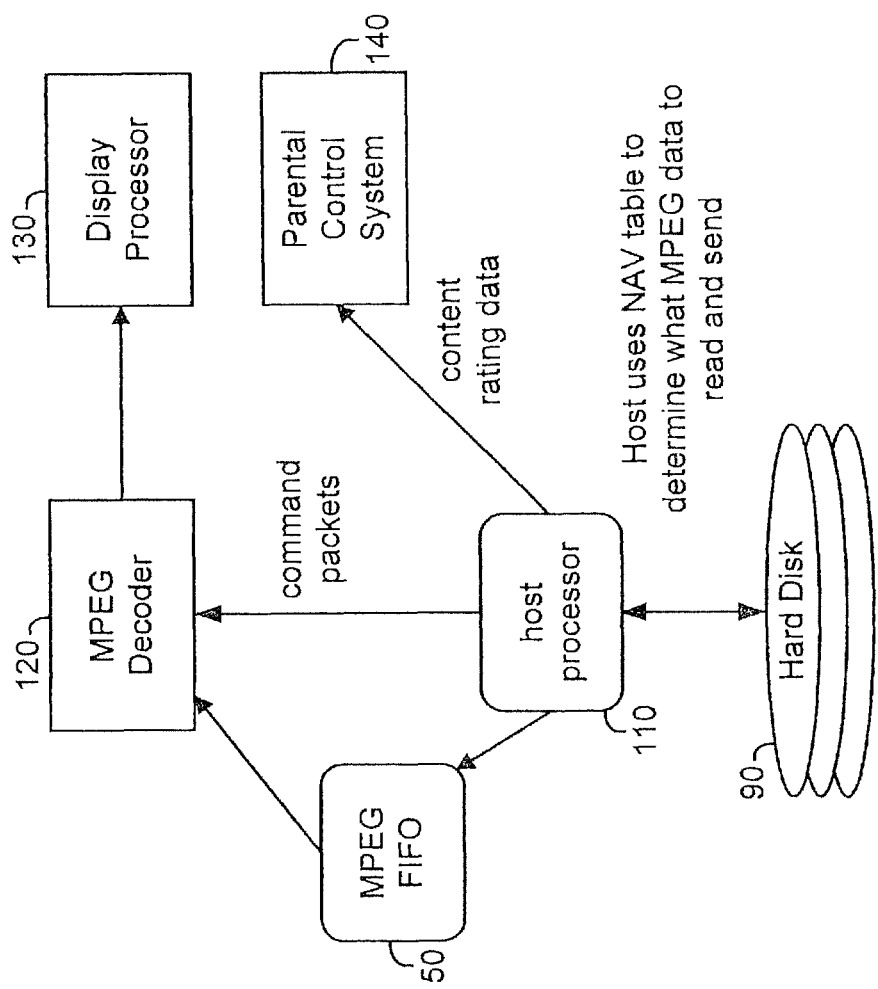
FIG. 3 is a schematic block diagram illustrating various elements in a PVR system for playing back certain frames of a data stream using the frame-correlated NAV table of FIG. 1 during a user-selected trick mode in accordance with an embodiment of the present invention.

FIG. 3 is a schematic block diagram illustrating various elements in a PVR system for playing back certain frames of an MPEG transport stream using the frame-correlated NAV table 100 during a user-selected trick mode in accordance with an embodiment of the present invention.

FIG. 3 shows the hard disk 90, the host processor 110, the MPEG FIFO 50, the frame-correlated NAV table 100 stored on the hard disk 90, an MPEG decoder 120, a parental control system 140, and a display processor 130.

In a PVR playback scenario, the host processor 110 uses the frame-correlated NAV table 100 to determine what parts of the MPEG transport stream should be read from the hard disk 90 and sent to the MPEG decoder 120. In the case of normal playback, the starting point in the MPEG file stored on hard disk 90 is determined, and then all MPEG data thereafter is sent. However, for trick modes, the frame-correlated NAV table 100 is constantly used in order to determine what MPEG data should be skipped and what should be sent to the MPEG decoder 120. Also, the content rating and conditional access (encryption) information is sent to various system components at the correct time.

Figure 4:
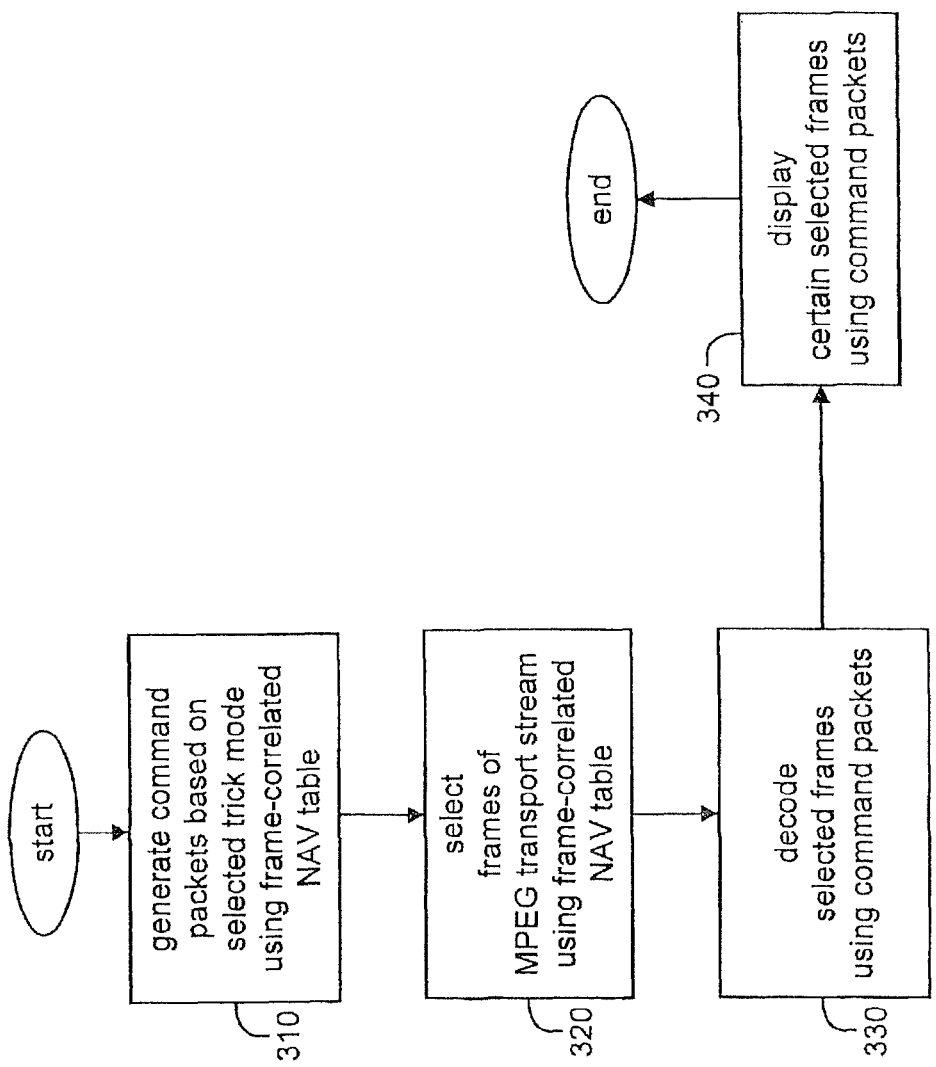
FIG. 4 is a flowchart of a method for playing back certain frames of a data stream in a PVR system using the frame-correlated NAV table of FIG. 1 during a user-selected trick mode in accordance with an embodiment of the present invention.

Referring to FIG. 4, during playback using a user-selected trick mode, command packets are generated by host processor 110 in step 310 of method 300 in accordance with an embodiment of the present invention. The command packets are generated based on the selected trick mode and the information in the frame-correlated NAV table. The command packets contain the information to tell the MPEG decoder 120 what to do for the selected trick mode. The command packets are then sent to MPEG decoder 120.

In step 320, the host processor 110 selects frames of the MPEG transport stream stored on hard disk 90 based on the NAV table information and sends the selected frames to MPEG decoder 120 via MPEG FIFO 50. In step 330, the MPEG decoder 120 decodes the selected frames based on information in the command packets.

In step 340, certain of the selected frames are processed for display by the MPEG decoder 120 and display processor 130 as part of the user-selected trick mode based on the information in the command packets.

The host processor 110 also sends content rating data to parental control system 140 such that the parental control system 140 may apply the proper viewing control parameters during the user-selected trick mode.

As an example, in an embodiment of the present invention, to perform a smooth-rewind trick mode in a GOP-based stream having the following GOP format and decoding order $I_0 B_1 B_2 P_3 B_4 B_5 P_6 B_7 B_8 I_9$, smooth rewind would be accomplished by displaying the frames in reverse display order. However, MPEG requires the P-frames decode against the previous P or I frame, and B-frames decode against the previous and next I or P frames. Therefore, the MPEG decoder 120 is configured to receive frames for decoding without necessarily displaying them right away.

If the host processor 110 is currently positioned at frame $I_9$ and wants to begin rewinding, the host processor 110 references the frame-correlated NAV table 100 and determines that frame $I_0$ is the reference frame for $I_9$. In fact, $I_9$ does not predict off of any frame, but the frame-correlated NAV table sets the reference frame of an I-frame and all immediately following B-frames as the previous GOP's I-frame for the purpose of facilitating the algorithm.

Before sending frame $I_0$ to MPEG decoder 120, the host processor 110 sends the sequence header for $I_0$. Similarly, the host processor 110 checks the content rating and encryption key data (conditional access data) for $I_0$ and updates the system if necessary. Finally, the host processor 110 sends frame $I_0$ for decoding only, and to be stored as the reference frame.

Next, the host processor 110 sends each P-frame between $I_0$ and $I_9$ to MPEG decoder 120 for decoding only. Before sending each frame, the sequence header, content rating data, and encryption key information is checked using the frame-correlated NAV table 100 and the system is updated. The final P-frame, $P_6$, is queued for later display. Finally, $I_9$ is sent but is never displayed. Since $I_9$ is never displayed, a small command packet may be substituted for $I_9$ as an optimization.

The host processor 110 then moves to the previous B-frame which is $B_8$. Using the frame-correlated NAV table, the host processor 110 determines that the reference frame corresponding to $B_8$ is frame $I_0$, however, because $I_0$ has already been sent as the reference frame, $I_0$ is not sent again.

Next, the host processor 110 sends each P-frame between $I_0$ and $I_9$ for decoding only. Before sending each frame, the sequence header, content rating and encryption key information is checked using the frame-correlated NAV table 100 and the system is updated. Finally $B_8$ is sent and is queued for display after $P_6$. Before sending $B_8$, the sequence header, content rating and encryption key information is checked using the frame-correlated NAV table 100 and the system is updated.

Another optimization may be obtained by sending $B_7$ (and any associated preceding information) immediately after $B_8$ because the reference frame for $B_7$ and the previous P-frames are the same as that for $B_8$. Sending $B_8$ causes $P_6$ to be pushed out of the queue and displayed, and $B_7$ pushes out $B_8$. A scan of the frame-correlated NAV table 100 determines how many B-frames may be grouped as such.

The host processor 110 then moves to the previous P-frame which is $P_6$. $I_0$ has already been sent as a reference frame. $P_3$ is sent as a decoding-only frame to be queued for later display. $P_6$ has already been queued and displayed, therefore, the actual $P_6$ frame does not need to be sent again. Instead, a small command packet may be sent in its place. When a small command packet is sent in place of $P_6$, $B_7$ is pushed out of the queue and is displayed.

As the algorithm is continued, the following rewind display order results:

$P_6 B_8 B_7 P_3 B_5 B_4 I_0 B_2 B_1 \ldots$

The frame-correlated NAV table 100 facilitates the algorithm by collecting all necessary data for each frame into the corresponding NAV table entry. The frame-correlated NAV table 100 makes the sequence header, reference frame, content rating and encryption information immediately available to the host processor 110 with very little processing.

As another example, in an embodiment of the present invention, to start a fast-forward trick mode in a progressive-refresh stream given a progressive-refresh stream with the following format $P_0 B_1 B_2 P_3 B_4 B_5 P_6 B_7 B_8 P_9 B_{10} B_{11} P_{12} B_{13} B_{14} P_{15}$, assume that a user wanted to start fast-forwarding from $P_{12}$ and that $P_{12}$'s reference frame was $P_0$. Then the nearest first-slice P-frame for $P_{12}$ is $P_0$. Assume that $P_0$, $P_3$ and $P_6$ may be used to build an entire reference frame, which means that $P_0$, $P_3$ and $P_6$ contain all the I-slices to compose a single, complete frame.

Before sending $P_{12}$ to be decoded, the host processor 110 uses the frame-correlated NAV table 100 to determine that the $P_0$ reference frame needs to be built. The host processor 110 sends the sequence header for $P_0$ in a command packet, then sends frames $P_0$, $P_3$ and $P_6$ for decode-only. Then the host processor 110 sends $P_9$ for decode only, then $P_{12}$ for decode and display. Subsequently, the host processor 110 may simply skip B's in order to accomplish a fast-forward trick mode.

If the host processor 110 wanted to skip P's, reference frames would be built to allow the subsequent P's to decode. The host processor 110 would also use the frame-correlated NAV table 100 to send sequence header, content rating, and encryption information in command packets as well.

Certain embodiments of the present invention are not limited to the previously described trick modes. Other trick modes may be implemented using the frame-correlated NAV table as well.

The various elements of the method and apparatus may be combined or separated according to various embodiments of the present invention. For example, the dual-direction MPEG FIFO 50 may be implemented as two separate FIFO's, one for recording and one for playback. Also, SCT FIFO 60, content rating module 70, and conditional access module 80 may all be integrated into SCD module 45 within the MPEG transport processor 40. In addition, timestamp generation may be accomplished by the MPEG transport processor 40 in accordance with an alternative embodiment of the present invention.

In summary, certain embodiments of the present invention afford an approach to facilitate efficient operation of trick modes in a PVR system by capturing and pre-processing stream-navigation data from the MPEG transport stream during recording of the MPEG transport stream.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method to facilitate efficient operation of trick modes in a personal video recording (PVR) system recording a data stream, said method comprising:
    capturing stream navigation data from said data stream during said recording;
    generating calculated navigation data from said stream navigation data during said recording; and
    generating at least one frame-correlated navigation table with one entry for each frame of said data stream, from at least one of said stream navigation data and said calculated navigation data during said recording,
    wherein said stream navigation data comprises at least one of content rating data and conditional access data.

2. The method of claim 1, wherein said data stream comprises an MPEG transport stream.

3. The method of claim 1, wherein said stream navigation data further comprises start code data.

4. The method of claim 1, further comprising:
    generating time stamp data such that said time stamp data correlates to said data stream; and
    writing said time stamp data to said at least one frame-correlated navigation table for each frame of said data stream during said recording.

5. The method of claim 1, further comprising storing said at least one frame-correlated navigation table within said PVR system such that said at least one frame-correlated navigation table may be accessed and used by said PVR system for trick modes during playback of said data stream.

6. The method of claim 1 wherein said stream navigation data comprises start code data that is in compliance with an MPEG standard and wherein said start code data comprises sequence headers, presentation time stamps (PTS's), and beginning of new picture data.

7. The method of claim 1, wherein said trick modes comprise forward, fast forward at a selected rate, and rewind at a selected rate.

8. The method of claim 1, wherein said data stream comprises a reference frame stream of I-frames, P-frames, and B-frames according to a standard GOP format.

9. The method of claim 1, wherein said data stream comprises a progressive refresh stream of P-frames and B-frames.

10. A method to facilitate efficient operation of trick modes in a personal video recording (PVR) system for playing back a recorded data stream, said method comprising:
    generating command packets based on, at least in part, a user-selected trick mode and at least one frame-correlated navigation table stored on said PVR system, wherein said at least one frame-correlated navigation table is generated, at least in part, based on one or more of start code data, content rating data, and conditional access data in said data stream;
    selecting frames of said data stream based on said at least one frame-correlated navigation table and said user-selected trick mode to generate a set of selected frames; and
    decoding said selected frames based on, at least in part, said command packets.

11. The method of claim 10, wherein said data stream comprises an MPEG transport stream.

12. The method of claim 10, further comprising decoding and displaying at least one of said selected frames during said user-selected trick mode based on at least one of said command packets.

13. The method of claim 10, wherein a one-to-one correspondence exists between each entry of said at least one frame-correlated navigation table and each of said frames of said data stream.

14. The method of claim 10, wherein said at least one frame-correlated navigation table is generated within said PVR system during recording of said data stream by capturing and processing stream-navigation data from said data stream, and wherein said stream-navigation data comprises at least one of said start code data, said content rating data, and said conditional access data.

15. The method of claim 14, wherein said start code data is in compliance with an MPEG standard and comprises sequence headers, presentation time stamps (PTS's), and beginning of new picture data.

16. The method of claim 10, wherein said at least one frame-correlated navigation table includes time stamp data generated by said PVR system during recording of said data stream and wherein said time stamp data is correlated to said data stream.

17. The method of claim 10, wherein said decoding comprises processing said command packets.

18. The method of claim 10, wherein said decoding comprises building at least one reference frame based on said selected frames and said command packets.

19. The method of claim 10, wherein said user-selected trick mode includes one of forward, fast forward at a selected rate, and rewind at a selected rate.

20. The method of claim 10, wherein said data stream comprises a reference frame stream of I-frames, P-frames, and B-frames according to a standard GOP format.

\* \* \* \* \*